United States Patent
Kadoya et al.

(10) Patent No.: US 10,759,916 B2
(45) Date of Patent: Sep. 1, 2020

(54) LAMP COVER

(71) Applicant: SUMITOMO CHEMICAL COMPANY, LIMITED, Tokyo (JP)

(72) Inventors: Hidenori Kadoya, Niihama (JP); Kazuhiro Yamazaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 16/485,723

(22) PCT Filed: Feb. 21, 2018

(86) PCT No.: PCT/JP2018/006264
§ 371 (c)(1),
(2) Date: Aug. 13, 2019

(87) PCT Pub. No.: WO2018/155501
PCT Pub. Date: Aug. 30, 2018

(65) Prior Publication Data
US 2020/0002486 A1 Jan. 2, 2020

(30) Foreign Application Priority Data

Feb. 23, 2017 (JP) ................................. 2017-031900

(51) Int. Cl.

| | | |
|---|---|---|
| *F21S 41/275* | (2018.01) | |
| *C08J 5/18* | (2006.01) | |
| *F21S 41/20* | (2018.01) | |
| *F21S 43/20* | (2018.01) | |
| *C08K 3/22* | (2006.01) | |
| *C08K 3/32* | (2006.01) | |
| *C08K 5/00* | (2006.01) | |
| *C08K 5/098* | (2006.01) | |
| *C08K 5/17* | (2006.01) | |

(52) U.S. Cl.
CPC ........ *C08J 5/18* (2013.01); *C08K 3/22* (2013.01); *C08K 3/32* (2013.01); *C08K 5/0041* (2013.01); *C08K 5/098* (2013.01); *C08K 5/17* (2013.01); *F21S 41/28* (2018.01); *F21S 43/26* (2018.01); *C08J 2333/10* (2013.01); *C08K 2003/2258* (2013.01); *C08K 2003/329* (2013.01); *C08K 2201/014* (2013.01)

(58) Field of Classification Search
CPC .............. C08J 5/18; F21S 41/28; F21S 41/26
USPC .......................................................... 362/510
See application file for complete search history.

(56) References Cited

U.S. PATENT DOCUMENTS

| 2,121,077 | A | * | 6/1938 | Ellis ................... C08G 12/12 528/260 |
|---|---|---|---|---|
| 10,531,555 | B1 | * | 1/2020 | Haynes .................... C08K 3/22 |
| 2015/0158274 | A1 | | 6/2015 | Yabuki et al. |
| 2016/0060160 | A1 | | 3/2016 | Machida et al. |
| 2017/0343183 | A1 | | 11/2017 | Wake |

FOREIGN PATENT DOCUMENTS

| CN | 102292658 A | 12/2011 |
|---|---|---|
| CN | 103723914 A | 4/2014 |
| CN | 104445922 A | 3/2015 |
| JP | 2011-40265 A | 2/2011 |
| JP | 2016-162637 A | 9/2016 |
| JP | 2017-26948 A | 2/2017 |
| WO | WO 2013/187350 A1 | 12/2013 |
| WO | WO 2014/163119 A1 | 10/2014 |
| WO | WO 2016/104375 A1 | 6/2016 |

OTHER PUBLICATIONS

International Preliminary Report on Patentability and the Written Opinion of the International Searching Authority for International Application No. PCT/JP2018/006264, dated Aug. 27, 2019.
International Search Report for International Application No. PCT/JP2018/006264, dated May 1, 2018.
Chinese Office Action and Search Report dated Mar. 27, 2020, for Chinese Application No. 201880013353.1, with English translation.

* cited by examiner

*Primary Examiner* — Christopher M Raabe
(74) *Attorney, Agent, or Firm* — Birch, Stewart, Kolasch & Birch, LLP

(57) ABSTRACT

The present invention provides a lamp cover comprising (1) a thermoplastic resin having a visible light transmissivity of 50% or higher measured in a form of a plate-like molded body having a thickness of 2 mm according to JIS R 3106, (2) a composite tungsten oxide, (3) at least one material selected from the group consisting of a metal soap, an antioxidant, and a first selective wavelength absorbing material having a maximum absorption wavelength within a range of 200 to 350 nm, whose content is 0.03% by mass or more based on a total content (100% by mass) of the components (1) to (4), and (4) a second selective wavelength absorbing material having a maximum absorption wavelength within a range of 450 to 550 nm.

11 Claims, No Drawings

LAMP COVER

TECHNICAL FIELD

The present invention relates to a lamp cover excellent in color tone, weather resistance and antifogging property, and useful as a cover material for a light source, such as a LED light source and a semiconductor laser, giving lower temperature rise of an irradiation object by its irradiation.

BACKGROUND ART

A methacrylic resin known as a thermoplastic resin is used as a raw material for vehicle members such as a tail lamp cover and a meter panel because of excellent transparency. Also, an aromatic polycarbonate resin is a thermoplastic resin excellent in transparency, heat resistance, and impact resistance, and therefore used as a raw material for vehicle members such as a headlamp cover.

For the tail lamps and headlamps of vehicles, an antifogging property for preventing fogging in a lamp is required. Conventionally, halogen lamps have been mainly used as tail lamps and headlamps, and the halogen lamps have provided a certain degree of antifogging effects by temperature rise of a lamp cover accompanying irradiation with an irradiation light from a light source. However, in recent years, LED lamps and semiconductor lasers are increasingly used as light sources for lamps, instead of conventional halogen lamps. However, these light sources cannot allow the temperature of the lamp cover to sufficiently rise when the lamp cover is irradiated with the radiation light. As a result, dew condensation is caused in the lamp cover, and the lamp cover tends to fog.

When such a light source giving low temperature rise of the lamp cover due to the irradiation of the light source is used, a lamp cover capable of absorbing heat rays such as sunlight to generate heat is required. A vehicle lamp equipped with a lamp cover comprising an infrared absorbent which satisfies such a request is known (Patent Document 1). It is described that such a vehicle lamp can provide an excellent antifogging property even without antifogging coating.

CITATION LIST

Patent Literature

Patent Literature 1: Japanese Patent Laid-Open Publication No. 2016-162637

SUMMARY OF THE INVENTION

Technical Problems

However, the present inventors have found that such a lamp cover that is comprised in the vehicle lamp described in Patent Literature 1 has problems that the visible light transmissivity is decreased by a long-term use and a color tone is possibly changed, i.e. the weather resistance is insufficient. In addition, they have found a problem that the transmissivity is increased under moist heat and hot environments, and the heat ray absorbability is decreased. Also, they have found a problem that although the lamp cover is desirably colorless, such a lamp cover looks bluish and is also unsatisfactory in the color tone.

An object of the present invention is to provide a lamp cover which exhibits an antifogging property even using the light source giving low temperature rise of the lamp cover due to the irradiation of the light source and is also excellent in weather resistance, heat resistance, moist heat resistance, and color tone.

Solution to Problems

The present invention includes the following aspects.
[1] A lamp cover comprising
  (1) a thermoplastic resin having a visible light transmissivity of 50% or higher measured in a form of a plate-like molded body having a thickness of 2 mm according to JIS R 3106,
  (2) a composite tungsten oxide,
  (3) at least one material selected from the group consisting of
    a metal soap,
    an antioxidant, and
    a first selective wavelength absorbing material having a maximum absorption wavelength within a range of 200 to 350 nm, whose content is 0.03% by mass or more based on a total content (100% by mass) of the components (1) to (4), and
  (4) a second selective wavelength absorbing material having a maximum absorption wavelength within a range of 450 to 550 nm.
[2] The lamp cover according to [1], wherein the composite tungsten oxide is represented by the general formula:

$$M^1_x W_y O_z$$

wherein
  $M^1$ is at least one element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten element, and O is oxygen element, and
  x, y, and z are numbers satisfying the following formulas:

$$0.01 \leq x \leq 1$$

$$0.001 \leq x/y \leq 1, \text{ and}$$

$$2.2 \leq z/y \leq 3.0.$$

[3] The lamp cover according to [2], wherein $M^1$ is at least one element selected from the group consisting of Li, Na, K, Rb, Cs, Mg, Ca, Sr and Ba.
[4] The lamp cover according to any one of [1] to [3], comprising as the component (3) at least the first selective wavelength absorbing material.
[5] The lamp cover according to any one of [1] to [4], comprising as the component (3) the first selective wavelength absorbing material, and the metal soap or the antioxidant.
[6] The lamp cover according to any one of [1] to [4], comprising as the component (3) the first selective wavelength absorbing material, the metal soap, and the antioxidant.
[7] The lamp cover according to any one of [1] to [6], comprising 0.03 to 0.5% by mass of the first selective wavelength absorbing material based on the total content (100% by mass) of the components (1) to (4).
[8] The lamp cover according to any one of [1] to [7], comprising 0.05 to 0.3% by mass of the metal soap based on the total content (100% by mass) of the components (1) to (4).

[9] The lamp cover according to any one of [1] to [8], comprising 0.05 to 0.3% by mass of the antioxidant based on the total content (100% by mass) of the components (1) to (4), wherein the antioxidant includes a hindered amine-based antioxidant or a phosphoric acid-based antioxidant.

[10] The lamp cover according to any one of [1] to [9], having a maximum transmissivity wavelength within a range of 550 to 780 nm.

Advantageous Effects of Invention

The lamp cover of the present invention can exhibit an antifogging property even using a light source with which temperature rise of the lamp cover due to irradiation with a radiation light such as a LED light source and a semiconductor laser is small, and is also excellent in weather resistance, heat resistance, moist heat resistance, and color tone.

DESCRIPTION OF EMBODIMENTS

The term "lamp cover" as used herein refers to a cover for a light source, which is used for a vehicle such as an automobile and a motorcycle, a street light, a desk lamp, and general lighting equipments such as a general household lighting, and is installed for the purpose of protecting the light source and improving an illuminance of the light source.

The lamp cover of the present invention may have a heat ray absorbability.

The term "heat ray absorbability" as used herein refers to a property of absorbing a heat ray. Herein, the term "heat ray" refers to an infrared light or an infrared ray having a longer wavelength than visible light, specifically a light having a wavelength within a range of 800 to 2000 nm capable of greatly affecting the temperature rise.

In an embodiment of the present invention, the lamp cover comprises (1) a thermoplastic resin having a visible light transmissivity of 50% or higher measured in a form of a plate-like molded body having a thickness of 2 mm according to JIS R 3106, (2) a composite tungsten oxide, (3) at least one material selected from the group consisting of a metal soap, an antioxidant, and a first selective wavelength absorbing material having a maximum absorption wavelength within a range of 200 to 350 nm, whose content is 0.03% by mass or more based on a total content (100% by mass) of the components (1) to (4), and (4) a second selective wavelength absorbing material having a maximum absorption wavelength within a range of 450 to 550 nm.

The components (1) to (4) constitute a thermoplastic resin composition, and the thermoplastic resin composition constitutes the lamp cover.

In the present specification, the lamp cover refers to a lamp cover having a property of absorbing a heat ray, specifically exhibiting a lower infrared transmissivity than of the thermoplastic resin contained in the lamp cover. Hereinafter, the lamp cover having the above configuration is referred to as "lamp cover of the present invention", and the thermoplastic resin composition constituting the lamp cover of the present invention is referred to as "thermoplastic resin composition of the present invention".

(Thermoplastic Resin)

In the lamp cover of the present invention, the thermoplastic resin functions as a substrate. The thermoplastic resin is a transparent thermoplastic resin, wherein a visible light transmissivity measured in a form of a plate-like molded body having a thickness of 2 mm according to JIS R 3106 is 50% or higher. A preferable example of the thermoplastic resin includes a thermoplastic resin wherein a haze measured in a form of a plate-like molded body having a thickness of 2 mm according to JIS K 7105 is 30% or lower, and an average spectral transmissivity (infrared transmissivity) at 800 to 2000 nm measured in a form of a plate-like molded body having a thickness of 2 mm according to JIS R 3106 is 70% or higher. Specifically, the thermoplastic resin may be one resin or a mixture of two or more resins selected from thermoplastic resins exemplified by a (meth)acrylic resin, an aromatic polycarbonate resin, a polyetherimide resin, a polyester resins and the like, a polystyrene resin, a polyether sulfone resin, a fluorine-based resin, and a polyolefin resin, depending on the desired properties. Above all, from the viewpoints of transparency and weather resistance, the (meth)acrylic resin is preferable and the methacrylic resin is more preferable. From the viewpoints of heat resistance and impact resistance, the aromatic polycarbonate resin is preferable. These resins may be used alone or in combination. The term "(meth)acrylic resin" as used herein refers to a resin comprising a monomer unit derived from an acrylic acid or an acrylate, and/or a monomer unit derived from a methacrylic acid or a methacrylate. In addition, the (meth)acrylic resin represents an acrylic resin or a methacrylic resin.

(Methacrylic Resin)

The methacrylic resin which can be used as the thermoplastic resin constituting the lamp cover of the present invention is a resin having 50 parts by mass or more of monomer units derived from a methacrylic acid or a methacrylate. Preferably, the methacrylic resin is a resin comprising monomer units derived from a methyl methacrylate and monomer units derived from an acrylate, and the resin can be obtained by polymerizing a monomer component comprising the methyl methacrylate and the acrylate. Contents of the monomer units derived from the methyl methacrylate and the monomer units derived from the acrylate in the methacrylic resin may be appropriately selected, but preferably the content of the monomer units derived from the methyl methacrylate is 85 to 100 parts by mass and the content of the monomer units derived from the acrylate is 0 to 15 parts by mass, and more preferably the content of the monomer units derived from the methyl methacrylate is 90 to 100 parts by mass and the content of the monomer units derived from the acrylate is 0 to 10 parts by mass. It is noted that the total content of the monomer units derived from the methyl methacrylate and the monomer units derived from the acrylate is 100 parts by mass. By setting the contents of the monomer units derived from the methyl methacrylate and the monomer units derived from the acrylate to within the above ranges, the heat resistance of the methacrylic resin can be enhanced.

Examples of the acrylate include methyl acrylate, ethyl acrylate, propyl acrylate, n-butyl acrylate, sec-butyl acrylate, tert-butyl acrylate, cyclohexyl acrylate, 2-ethylhexyl acrylate, and the like. Above all, methyl acrylate and ethyl acrylate are preferable. It is noted that one or two or more types of the acrylates may be used.

As a polymerization method in polymerizing the monomer component, e.g. a known polymerization method such as suspension polymerization, solution polymerization and bulk polymerization can be adopted, and above all, bulk polymerization is preferable. Although both a batch system and a continuous system can be adopted as the bulk polymerization, a polymer can be obtained with high productivity, for example, by a method in which a monomer component and a polymerization initiator are continuously fed into a reactor, meanwhile they are retained in the reactor for a predetermined time to obtain a partial polymer, and this partial polymer is continuously drawn.

As the polymerization initiator used in polymerizing the monomer component, for example, a known radical polymerization initiator such as an azo compound such as azobisisobutyronitrile and a peroxide such as 1,1-di(tert-butylperoxy)cyclohexane can be used. It is noted that one or two or more types of the polymerization initiators may be used.

When the monomer components are polymerized, a chain-transfer agent can be used, as necessary. Preferable examples of the chain-transfer agent include mercaptans such as n-butyl mercaptan, n-octyl mercaptan, n-dodecyl mercaptan and 2-ethylhexyl thioglycolate, and the like. It is noted that one or two or more types of the chain-transfer agents may be used.

A molecular weight distribution index defined by a weight average molecular weight/number average molecular weight of the methacrylic resin used in the present invention is preferably 1.8 to 6.0. Particularly, in order to obtain a methacrylic resin having a molecular weight distribution index of 2.2 or higher, a known polymerization method such as a method using various radical polymerization initiators, a method using various chain-transfer agents, and a method including combined multistage polymerization steps is suitably used. The molecular weight distribution index can be measured by gel permeation chromatography (GPC).

In addition, the methacrylic resin having the molecular weight distribution index of 2.2 or higher may be prepared by mixing two or more types of methacrylic resins having different weight average molecular weights. As a method of mixing two or more types of methacrylic resins, for example a melt-kneading method, a solvent kneading method, a dry blending method, and the like are used, and from the viewpoint of productivity, the melt-kneading method and the dry blending method are preferably used. As an apparatus used for mixing, an ordinary mixer, a kneader, and the like can be used, and specific examples thereof include a single-screw kneading extruder, a twin-screw kneading extruder, a ribbon blender, a Henschel mixer, a Banbury mixer, a drum tumbler, and the like.

(Aromatic Polycarbonate Resin)

The "aromatic polycarbonate resin" as used herein refers to a polycarbonate resin comprising structural units derived from an aromatic dihydroxy compound. Examples of the aromatic polycarbonate resin which can be used as a thermoplastic resin in the present invention include an aromatic polycarbonate resin obtained by reacting a dihydric phenol and a carbonylating agent using an interfacial polycondensation method, a melt transesterification method, or the like; an aromatic polycarbonate resin obtained by polymerizing a carbonate prepolymer using a solid-phase transesterification method or the like; an aromatic polycarbonate resin obtained by polymerizing a cyclic carbonate compound using a ring opening polymerization method; and the like.

Examples of the dihydric phenol include hydroquinone, resorcinol, 4,4'-dihydroxydiphenyl, bis(4-hydroxyphenyl)methane, bis{(4-hydroxy-3,5-dimethyl)phenyl}methane, 1,1-bis(4-hydroxyphenyl)ethane, 1,1-bis(4-hydroxyphenyl)-1-phenylethane, 2,2-bis(4-hydroxyphenyl)propane (commonly called Bisphenol A), 2,2-bis{(4-hydroxy-3-methyl)phenyl}propane, 2,2-bis{(4-hydroxy-3,5-dimethyl)phenyl}propane, 2,2-bis{(4-hydroxy-3,5-dibromo)phenyl}propane, 2,2-bis{(3-isopropyl-4-hydroxy)phenyl}propane, 2,2-bis{(4-hydroxy-3-phenyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,4-bis(4-hydroxyphenyl)-2-methylbutane, 2,2-bis(4-hydroxyphenyl)pentane, 2,2-bis(4-hydroxyphenyl)-4-methylpentane, 1,1-bis(4-hydroxyphenyl)cyclohexane, 1,1-bis(4-hydroxyphenyl)-4-isopropylcyclohexane, 1,1-bis(4-hydroxyphenyl)-3,3,5-trimethylcyclohexane, 9,9-bis(4-hydroxyphenyl)fluorene, 9,9-bis{(4-hydroxy-3-methyl)phenyl}fluorene, α,α'-bis(4-hydroxyphenyl)-o-diisopropylbenzene, α,α'-bis(4-hydroxyphenyl)-m-diisopropylbenzene, α,α'-bis(4-hydroxyphenyl)-p-diisopropylbenzene, 1,3-bis(4-hydroxyphenyl)-5,7-dimethyladamantane, 4,4'-dihydroxydiphenyl sulfone, 4,4'-dihydroxydiphenyl sulfoxide, 4,4'-dihydroxydiphenyl sulfide, 4,4'-dihydroxydiphenyl ketone, 4,4'-dihydroxydiphenyl ether, and 4,4'-dihydroxydiphenyl ester. These compounds may be used alone or in combination.

Among these dihydric phenols, Bisphenol A, 2,2-bis{(4-hydroxy-3-methyl)phenyl}propane, 2,2-bis(4-hydroxyphenyl)butane, 2,2-bis(4-hydroxyphenyl)-3-methylbutane, 2,2-bis(4-hydroxyphenyl)-3,3-dimethylbutane, 2,2-bis(4-hydroxyphenyl)-4-methylpentane, 1,1-bis(4-hydroxyphenyl)-3,3,5-trimethylcyclohexane, and α,α'-bis(4-hydroxyphenyl)-m-diisopropylbenzene are preferable. Particularly, it is preferable to use Bisphenol A alone, or to use a combination of Bisphenol A with at least one selected from the group consisting of 1,1-bis(4-hydroxyphenyl)-3,3,5-trimethylcyclohexane, 2,2-bis{(4-hydroxy-3-methyl)phenyl}propane, and α,α'-bis(4-hydroxyphenyl)-m-diisopropylbenzene.

Examples of the carbonylating agent include a carbonyl halide (such as phosgene), a carbonate ester (such as diphenyl carbonate), and a haloformate (such as dihaloformate which is a dihydric phenol). These compounds may be used alone or in combination.

The thermoplastic resin may contain additives such as a mold release agent, a colorant, a polymerization inhibitor, a flame retardant, and a reinforcer. In addition, the thermoplastic resin may contain a dye (e.g. blue dye) other than the second selective wavelength absorbing material.

(Composite Tungsten Oxide)

The lamp cover of the present invention comprises a composite tungsten oxide. By containing the composite tungsten oxide in the lamp cover, an excellent infrared shielding performance, i.e. heat ray absorbability can be obtained, and the antifogging property is improved.

The composite tungsten oxide used in the present invention refers to a compound represented by a compositional formula including tungsten element, oxygen element, and an element other than tungsten element and oxygen element, preferably refers to a composite tungsten oxide represented by the general formula:

$$M^1{}_xW_yO_z$$

wherein $M^1$ is at least one element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I, W is tungsten element, and O represents oxygen element, and x, y, and z are numbers satisfying the following formulas:

$$0.01 \leq x \leq 1$$

$$0.001 \leq x/y \leq 1, \text{ and}$$

$$2.2 \leq z/y \leq 3.0.$$

Above all, $M^1$ is preferably at least one element selected from the group consisting of Li, Na, K, Rb, Cs, Mg, Ca, Sr and Ba, and most preferably K, Rb or Cs. In addition, x is preferably within a range of $0.01 \leq x \leq 0.5$, more preferably a range of $0.2 \leq x \leq 0.4$. Furthermore, x/y and z/y are preferably within ranges of $0.01 \leq x/y \leq 0.5$ and $2.7 \leq z/y \leq 3.0$, respectively, more preferably ranges of $0.2 \leq x/y \leq 0.4$ and $2.8 \leq z/y \leq 3.0$, respectively.

The composite tungsten oxide used in the present invention is preferably a composite oxide composed of a tungsten oxide component and cesium tungsten oxide.

A content of the composite tungsten oxide in the lamp cover of the present invention is preferably 1 to 5000 ppm by mass based on the total content (100% by mass) of the components (1) to (4) from the viewpoints of the infrared shielding performance and the antifogging property. The content of the composite tungsten oxide based on the total content (100% by mass) of the components (1) to (4) is preferably 5000 ppm by mass or less, more preferably 3000 ppm by mass or less, even more preferably 2000 ppm by mass or less from the viewpoints of color tone and fine dispersibility. The content of the composite tungsten oxide is preferably 10 ppm by mass or more, more preferably 100 ppm by mass or more, even more preferably 200 ppm by mass or more from the viewpoint of antifogging property.

The composite tungsten oxide used in the present invention is preferably in a form of a fine particle. An average particle size of the fine particle of the composite tungsten oxide is normally 1 to 800 nm, preferably 1 to 500 nm, more preferably 1 to 300 nm, even more preferably 1 to 100 nm, particularly preferably 1 to 50 nm, most preferably 1 to 30 nm. When the average particle size is 1 nm or larger, aggregation of the fine particle can be suppressed, and therefore faulty dispersibility can be effectively prevented, and when the average particle size is 500 nm or smaller, the antifogging property of the lamp cover of the present invention can be improved. It is noted that, in the present invention, the average particle size of the composite tungsten oxide fine particle means a secondary particle size. The average particle size of the composite tungsten oxide fine particle can be measured by a commercially available particle size distribution meter. The average particle size can be measured using e.g. ESL-800 manufactured by OTSUKA ELECTRONICS Co., LTD based on a dynamic light scattering method as a principle.

The composite tungsten oxide fine particle can be obtained by heat-treating a tungsten compound as a starting material in an inert gas atmosphere or a reducing gas atmosphere. The composite tungsten oxide fine particle obtained by the heat treatment has a sufficient near-infrared shielding ability.

The starting material for the composite tungsten oxide fine particle represented by the general formula $M^1_xW_yO_z$ is a tungsten compound containing an element $M^1$ in a form of a single element or a compound. Specifically, the starting material is preferably one or more powders selected from the group consisting of a tungsten trioxide powder, a tungsten dioxide powder, a tungsten oxide hydrate powder, a tungsten hexachloride powder, an ammonium tungstate powder, a tungsten oxide hydrate powder obtained by dissolving tungsten hexachloride in alcohol and then drying it, a tungsten oxide hydrate powder obtained by dissolving tungsten hexachloride in alcohol, then adding water to the solution to precipitate it, and drying the produced precipitate, an ammonium tungstate powder obtained by drying an ammonium tungstate aqueous solution, and a metallic tungsten powder, which contain the element $M^1$ in a form of a single element or a compound. It is more preferable to use an ammonium tungstate aqueous solution or a tungsten hexachloride aqueous solution from the viewpoint that each element can be uniformly mixed with ease when the starting material is a solution. The composite tungsten oxide fine particle can be obtained by heat-treating these raw materials in an inert gas atmosphere or a reducing gas atmosphere.

Herein, in producing a tungsten compound as the starting material for the composite tungsten oxide fine particle, it is preferable that each raw material is mixed in a solution, and the tungsten compound containing the element $M^1$ can be dissolved in a solvent such as water and an organic solvent. Examples of such a compound include tungstate salt, chloride, nitrate salt, sulfate salt, oxalate salt, oxide, carbonate salt, hydroxide, and the like, which contain the element $M^1$, but are not limited these compounds, and any compound which can be prepared in a solution form is preferable.

Hereinafter, the aforementioned raw material for producing the composite tungsten oxide fine particle will be explained in detail again.

As the starting material for obtaining the composite tungsten oxide fine particle represented by the general formula $M^1_xW_xO_z$, it is possible to use a powder prepared by mixing a powder containing the element $M^1$ in a form of a single element or a compound, with at least one powder selected from the group consisting of a tungsten trioxide powder, a tungsten dioxide powder, a tungsten oxide hydrate powder, a tungsten hexachloride powder, an ammonium tungstate powder, a tungsten oxide hydrate powder obtained by dissolving tungsten hexachloride in alcohol and then drying it, or a tungsten oxide hydrate powder obtained by dissolving tungsten hexachloride in alcohol, then adding water to the solution to precipitate it, and drying the produced precipitate, an ammonium tungstate powder obtained by drying an ammonium tungstate aqueous solution, and a metallic tungsten powder.

Furthermore, when the tungsten compound as the starting material for obtaining the composite tungsten oxide fine particle is a solution or a dispersion, each element can be uniformly mixed with ease.

From this viewpoint, it is more preferable that the starting material for the composite tungsten oxide fine particle is a powder obtained by mixing an alcohol solution of tungsten hexachloride or an ammonium tungstate aqueous solution with the solution of the compound containing the element $M^1$ and then drying the mixture.

Similarly, it is also preferable that the starting material for the composite tungsten oxide fine particle is a powder prepared by mixing a dispersion prepared by dissolving tungsten hexachloride in alcohol and then adding water to the solution to generate a precipitate, with a powder containing the element $M^1$ in a form of a single element or a compound or a solution of a compound containing the element $M^1$, and then drying the mixture.

Examples of the compound containing the element $M^1$ include tungstate salt, chloride, nitrate salt, sulfate salt, oxalate salt, oxide, carbonate salt, hydroxide, and the like, of the element $M^1$, but are not limited to these compounds, and may be any compound which can be prepared in a solution form. When the composite tungsten oxide fine particle is industrially produced, a production method using a tungsten oxide hydrate powder or a tungsten trioxide powder with a carbonate salt or hydroxide of the element $M^1$ is preferably adopted because a harmful gas and the like are not generated in a step of heat treatment or the like.

Herein, a temperature for heat-treating the starting material for the composite tungsten oxide fine particle in an inert atmosphere is preferably 650° C. or higher. The starting material heat-treated at 650° C. or higher has a near-infrared shielding ability sufficient as an infrared shielding fine particle, and has a good infrared shielding efficiency. As the inert gas, it is preferable to use an inert gas such as Ar and $N_2$. In addition, a temperature for heat-treatment in a reducing atmosphere is preferably 100 to 850° C. The reducing gas in this step is not particularly limited, but is preferably $H_2$. When $H_2$ is used as the reducing gas, in the reducing atmosphere composition, a $H_2$ content is preferably 0.1% by volume or more, more preferably 2% by volume or more. When the $H_2$ content is 0.1% by volume or more, reduction can be efficiently progressed. As a method for producing the composite tungsten oxide fine particle, it is preferable that a starting material is heat-treated in a reducing gas atmosphere at 100 to 850° C., and then in an inert gas atmosphere at 650 to 1200° C.

From the viewpoint of improving the weather resistance, it is preferable that the surface of the composite tungsten oxide fine particle obtained in the aforementioned process is coated with an oxide containing at least one metal selected from the group consisting of Si, Ti, Zr, and Al. Although the coating method is not particularly limited, the surface of the composite tungsten oxide fine particle can be coated by adding the aforementioned metal alkoxide into a solution containing the dispersed composite tungsten oxide fine particle. The composite tungsten oxide fine particle having the coated surface may be used in a powder condition or in a condition dispersed in a solution.

In addition, the composite tungsten oxide fine particle is preferably coated with a dispersant. Examples of the dispersant include polymethylmethacrylate, polycarbonate, polysulfone, polyacrylonitrile, polyarylate, polyethylene, polyvinyl chloride, polyvinylidene chloride, fluororesin, polyvinylbutyral, polyvinyl alcohol, polystyrene, silicone-based resin, derivatives thereof, and the like. By coating with these dispersants, the composite tungsten oxide fine particle has effects of improving the dispersibility when adding the fine particle to a resin, and furthermore of preventing decreases in bending strength, impact strength, and tensile strength. Examples of the coating method with the dispersant include a method in which a composite tungsten oxide fine particle and a dispersant are added to a solvent such as toluene and stirred to prepare a dispersion, and then the solvent is removed by vacuum drying or the like to coat the composite tungsten oxide fine particle, and the like.

In addition, examples of the method of adding the composite tungsten oxide to a thermoplastic resin include a method of directly adding the composite tungsten oxide fine particle, and a method of diluting the composite tungsten oxide fine particle with a thermoplastic resin in an amount 1 to 100 times by weight more than the particle, and then further adding the thermoplastic resin to the dilution.

Once a resin lamp cover containing a composite tungsten oxide is exposed to ultraviolet ray for a long time, the resin is oxidatively deteriorated to generate protons. The protons act on the composite tungsten oxide to reduce the composite tungsten oxide, and as a result, the infrared absorption property of the composite tungsten oxide is changed. The visible light transmissivity of the lamp cover is decreased due to the oxidative deterioration of the resin and the reduction of the composite tungsten oxide. In addition, once the lamp cover is exposed to a high temperature environment for a long time, the composite tungsten oxide is oxidized and the infrared absorbability of the lamp cover is decreased. By using at least one material selected from the group consisting of a first selective wavelength absorbing material having a maximum absorption wavelength within a range of 200 to 350 nm in a content of 0.03% by mass or more based on a total content (100% by mass) of the components (1) to (4), a metal soap, and an antioxidant, decreases in the visible light transmissivity and the heat ray absorbability can be suppressed and change in the color tone can be decreased, thereby providing a lamp cover excellent weather resistance and heat resistance.

(First Selective Wavelength Absorbing Material)

The lamp cover of the present invention comprises a first selective wavelength absorbing material. The first selective wavelength material has a maximum absorption wavelength within a range of 200 to 350 nm. By containing the first selective wavelength absorbing material in the lamp cover, deterioration of the thermoplastic resin due to light, particularly ultraviolet ray can be suppressed, thereby obtaining excellent weather resistance. The term "selective wavelength absorbing material" as used herein refers to a material having a maximum absorption wavelength within a particular range.

Examples of the first selective wavelength absorbing material used in the present invention include a benzotriazole-based ultraviolet absorber, a triazine-based ultraviolet absorber, a malonate-based ultraviolet absorber, an anilide oxalate-based ultraviolet absorber, and the like.

Examples of the benzotriazole-based ultraviolet absorber include 2-(2-hydroxy-5-methylphenyl)benzotriazole (e.g. Sumisorb 200 (manufactured by Sumika Chemtex Co., Ltd., Tinuvin P (manufactured by BASF SE)), 2-[2-hydroxy-3-(4,5,6,7-tetrahydro-1,3-dioxo-1H-isoindole-2-ylmethyl)-5-methylphenyl]-2H-benzotriazole (e.g. Sumisorb 250 (manufactured by Sumika Chemtex Co., Ltd.), SEESORB 706 (manufactured by SHIPRO KASEI KAISHA, LTD.)), 2-(2-hydroxy-5-tert-octylphenyl)benzotriazole (e.g. Sumisorb 340 (manufactured by Sumika Chemtex Co., Ltd.), Tinuvin 329 (manufactured by BASF SE), SEESORB 709 (manufactured by SHIPRO KASEI KAISHA, LTD.)), 2,2'-methylenebis[6-(benzotriazol-2-yl)-4-tert-octylphenol] (e.g. ADK STAB LA-31 (manufactured by ADEKA CORPORATION), Tinuvin 360 (manufactured by BASF SE)), 2-(2-hydroxy-5-methylphenyl)benzotriazole (e.g. LA-32 (manufactured by ADEKA CORPORATION)), 2-(2-hydroxy-4-octyloxyphenyl)-2H-benzotriazole (e.g. SEESORB 707 (manufactured by SHIPRO KASEI KAISHA, LTD.)), 2-(2H-benzotriazol-2-yl)-4,6-di-tert-butylphenol (e.g. SEESORB 705 (manufactured by SHIPRO KASEI KAISHA, LTD.)), and the like.

Examples of the triazine-based ultraviolet absorber include 2-(4,6-diphenyl-1,3,5-triazin-2-yl)-5-[2-(2-ethylhexanoyloxy)ethoxy]phenol (ADK STAB LA-46 (manufactured by ADEKA CORPORATION), 2-(4,6-diphenyl-1,3,5-triazin-2-yl)-5-[(hexyl)oxy]-phenol (Tinuvin 1577 (manufactured by BASF SE)), 2-[4,6-bis(1,1'-biphenyl-4-yl)-1,3,5-triazin-2-yl]-5-[(2-ethylhexyl)oxy]phenol (Tinuvin 1600 (manufactured by BASF SE), 2-[4,6-di(2,4-xylyl)-

1,3,5-triazin-2-yl]-5-octyloxyphenol (KEMISORB 102 (manufactured by CHEMIPRO KASEI KAISHA. LTD.), and the like.

Examples of the malonate-based ultraviolet absorber include dimethyl 4-methoxybenzylidene malonate (Hostavin PR-(manufactured by CLARIANT CHEMICALS K.K.)), α,α'-bis(ethoxycarbonyl)-1,4-benzenedipropenoic acid diethyl (Hostavin B-CAP (manufactured by CLARIANT CHEMICALS K.K.)), and the like.

Examples of the anilide oxalate-based ultraviolet absorber include N-(2-ethoxyphenyl)-N'-(4-ethylphenyl)oxamide (Hostavin VSU (manufactured by CHEMIPRO KASEI KAISHA. LTD.)), and the like.

The first selective wavelength absorbing material may be used alone or in combination of two or more.

A content (total content in the case of containing two or more types) of the first selective wavelength absorbing material in the lamp cover of the present invention is 0.03% by mass or more, preferably 0.03 to 0.5% by mass, more preferably 0.03 to 0.2% by mass, even more preferably 0.05 to 0.1% by mass based on the total content (100% by mass) of the components (1) to (4). By setting the content of the first selective wavelength absorbing material to 0.03% by mass or more, deterioration of the thermoplastic resin due to light can be more effectively suppressed compared to a lamp cover containing less than 0.03% by mass of first selective wavelength absorbing material, and a lamp cover excellent in weather resistance can be obtained. Furthermore, by setting the content of the first selective wavelength absorbing material to 0.5% by mass or less, decrease in yellowishness and heat ray absorbability can be suppressed. In addition, mold staining in molding the thermoplastic resin composition into the lamp cover can be prevented.

(Metal Soap)

The lamp cover of the present invention comprises a metal soap. By containing a metal soap in the lamp cover, reduction of the composite tungsten oxide in the thermoplastic resin can be suppressed and color change of the lamp cover can be suppressed, thereby obtaining excellent weather resistance.

The metal soap used in the present invention is a salt of a fatty acid and a metal, e.g. a salt represented by the general formula:

$(C_mH_nCOO)_l M^2$ wherein, $M^2$ is at least one element selected from the group consisting of Li, Na, Mg, Ca, Sr, Ba, and Zn, l is 1 or 2, m is an integer of 10 to 22, and n is 2m+1 or 2m.

Examples of the metal soap include preferably a sodium salt of lauric acid, myristic acid, pentadecylic acid, palmitic acid, palmitoleic acid, margaric acid, or stearic acid; a lithium salt of lauric acid, myristic acid, pentadecylic acid, palmitic acid, palmitoleic acid, margaric acid or stearic acid; or a magnesium salt of lauric acid, myristic acid, pentadecylic acid, palmitic acid, palmitoleic acid, margaric acid or stearic acid, and above all, magnesium stearate is more preferable.

The metal soap may be used alone or in combination of two or more.

A content (total content in the case of containing two or more types) of the metal soap in the lamp cover of the present invention is preferably 0.03 to 1% by mass, more preferably 0.03 to 0.3% by mass, even more preferably 0.05 to 0.3% by mass based on the total content (100% by mass) of the components (1) to (4). By setting the content of the metal soap to 0.03% by mass or more, reduction and oxidation reaction of the composite tungsten oxide in the thermoplastic resin can be more effectively suppressed, thereby obtaining a lamp cover excellent in weather resistance. Furthermore, by setting the content of the metal soap to 1% by mass or less, a lamp cover excellent in color tone can be obtained. In addition, mold staining in molding the thermoplastic resin composition into the lamp cover can be prevented.

(Antioxidant)

The lamp cover of the present invention comprises an antioxidant. By containing an antioxidant in the lamp cover, oxidation of the thermoplastic resin can be suppressed to obtain excellent weather resistance. The term "antioxidant" as used herein refers to a component having a function of suppressing oxidation of the thermoplastic resin.

Examples of the antioxidant used in the present invention include a hindered amine-based antioxidant, a phenol-based antioxidant, a phosphoric acid-based antioxidant, and the like. The antioxidant is preferably the hindered amine-based antioxidant, the phosphoric acid-based antioxidant, or a combination of both.

Examples of the hindered amine-based antioxidant include poly[{6-(1,1,3,3-tetramethylbutyl)amino-1,3,5-triazine-2,4-diyl}{(2,2,6,6-tetramethyl-4-piperidyl)imino}-1,6-hexamethylene{(2,2,6,6-tetramethyl-4-piperidyl)imino}].

Examples of the phenol-based antioxidant include pentaerythritoltetrakis[3-(3,5-di-tert-butyl-4-hydroxyphenyl)propionate] (e.g. Irganox 1010 manufactured by BASF SE), octadecyl-3-(3,5-di-tert-butyl-4-hydroxyphenyl)propionate (e.g. Irganox 1076 manufactured by BASF SE), 2,4,6-tris(3',5'-di-tert-butyl-4'-hydroxybenzyl)mesitylene (e.g. Irganox 1330 manufactured by BASF SE), 1,3,5-tris(3,5-di-tert-butyl-4-hydroxybenzyl)-1,3,5-triazine-2,4,6 (1H, 3H, 5H)-trione (e.g. Irganox 3114 manufactured by BASF SE), 1,3,5-tris((4-tert-butyl-3-hydroxy-2,6-xylyl)methyl)-1,3,5-triazine-2,4,6 (1H, 3H, 5H)-trione (e.g. Irganox 3790 manufactured by BASF SE), thiodiethylenebis[3-(3,5-di-tert-butyl-4-hydroxyphenyl)propionate] (e.g. Irganox 1035 manufactured by BASF SE), benzenepropanoic acid, 3,5-bis(1,1-dimethylethyl)-4-hydroxy, C7-C9 side-chain alkyl ester (e.g. Irganox 1135 manufactured by BASF SE), 4,6-bis(octylthiomethyl)-o-cresol (e.g. Irganox 1520 L manufactured by BASF SE), 3,5-di-tert-butyl-4-hydroxyhydrocinnamic acid 1,3,5-tris(2-hydroxyethyl)-s-triazinetrione ester (e.g. Irganox 3125 manufactured by BASF SE), 2,4-bis(n-octylthio)-6-(4-hydroxy-3',5'-di-tert-butylanilino)-1,3,5-triazine (e.g. Irganox 565 manufactured by BASF SE), 3,9-bis(2-(3-(3-tert-butyl-4-hydroxy-5-methylphenyl)propionyloxy)-1,1-dimethylethyl)-2,4,8,10-tetraoxaspiro[5.5]undecane (e.g. ADK STAB AO-80 manufactured by ADEKA CORPORATION), 2,6-di-tert-butyl-p-cresol (e.g. Sumilizer BHT manufactured by Sumitomo Chemical Co., Ltd.), 3,9-bis[2-[3-(3-tert-butyl-4-hydroxy-5-methylphenyl)propionyloxy]-1,1-dimethylethyl]-2,4,8,10-tetraoxaspiro[5.5]undecane (e.g. Sumilizer GA-80 manufactured by Sumitomo Chemical Co., Ltd.), 2-[1-(2-hydroxy-3,5-di-tert-pentylphenyl)ethyl]-4,6-di-tert-pentylphenyl acrylate (e.g. Sumilizer GS manufactured by Sumitomo Chemical Co., Ltd.), 1,3,5-tris[[4-(1,1-dimethylethyl)-3-hydroxy-2,6-dimethylphenyl]methyl]-1,3,5-triazine-2,4,6 (1H,3H,5H)-trione (e.g. Cyanox 1790 manufactured by Scitech Co., Ltd.), vitamin E, and the like.

Examples of the phosphoric acid-based antioxidant include tris(2,4-di-tert-butylphenyl)phosphite (e.g. Irgafos 168 manufactured by BASF SE), tris[2-[[2,4,8,10-tetra-tert-butyldibenzo[d,f][1,3,2]dioxaphosphine-6-yl]oxy]ethyl]

amine (e.g. Irgafos 12 manufactured by BASF SE), bis[2,4-bis(1,1-dimethylethyl)-6-methylphenyl]phosphorous acid ethyl ester (e.g. Irgafos 38 manufactured by BASF SE), tris(mono-dinonylphenyl)phosphite) (e.g. ADK STAB 329K manufactured by ADEKA CORPORATION), bis(2,6-di-tert-butyl-4-methylphenyl)pentaerythritol-di-phosphite (e.g. ADK STAB PEP36 manufactured by ADEKA CORPORATION), 3,9-bis(octadecyloxy)-2,4,8,10-tetraoxa-3,9-diphosphaspiro[5.5]undecane (e.g. ADK STAB PEP-8 manufactured by ADEKA CORPORATION), 4,4',4'',4'''-[[(1,1'-biphenyl-4,4'-diyl)bis(phosphinetriyl)]tetrakisoxy]tetrakis(1,3-di-tert-butylbenzene) (e.g. Sandstab P-EPQ manufactured by CLARIANT), 3,9-bis(octadecyloxy)-2,4,8,10-tetraoxa-3,9-diphosphaspiro[5.5]undecane (e.g. Weston 618 manufactured by General Electric Company), Weston 619G (e.g. Weston 619G manufactured by General Electric Company), 3,9-bis(2,4-di-tert-butylphenoxy)-2,4,8,10-tetraoxa-3,9-diphosphaspiro[5.5]undecane (e.g. Ultranox 626 manufactured by General Electric Company), 6-[3-(3-tert-butyl-4-hydroxy-5-methylphenyl)propoxy]-2,4,8,10-tetra-tert-butyldibenz[d,f][1,3,2]dioxaphosphepin (e.g. Sumilizer GP manufactured by Sumitomo Chemical Co., Ltd.), and the like.

The antioxidant may be used alone or in combination of two or more.

A content (total content in the case of containing two or more types) of the antioxidant in the lamp cover of the present invention is preferably 0.03 to 1% by mass, more preferably 0.05 to 0.3% by mass, even more preferably 0.05 to 0.2% by mass based on the total content (100% by mass) of the components (1) to (4). By setting the content of the antioxidant to 0.03% by mass or more, oxidation of the thermoplastic resin can be more effectively suppressed, thereby obtaining a lamp cover excellent in weather resistance. Furthermore, by setting the content of the antioxidant to 1% by mass or less, a lamp cover excellent in color tone can be obtained. In addition, mold staining in molding the thermoplastic resin composition into the lamp cover can be prevented.

The first selective wavelength absorbing material, the metal soap and the antioxidant may be used alone or in combination of two or more. For example, the lamp cover of the present invention may include any one of the first selective wavelength absorbing material, the metal soap and the antioxidant, or may include a combination of the first selective wavelength absorbing material and the metal soap, a combination of the first selective wavelength absorbing material and the antioxidant or a combination of the metal soap and the antioxidant, or may include a combination of the first selective wavelength absorbing material, the metal soap and the antioxidant. The combination of the first selective wavelength absorbing material and the antioxidant, the combination of the first selective wavelength absorbing material, the metal soap and the antioxidant, a combination of the first selective wavelength absorbing material and the hindered amine-based antioxidant, a combination of the first selective wavelength absorbing material and the phosphoric acid-based antioxidant, and a combination of the first selective wavelength absorbing material, the hindered amine-based antioxidant and the phosphoric acid-based antioxidant are preferable.

When at least two selected from the group consisting of the first selective wavelength absorbing material, the metal soap and the antioxidant are used, the total content is preferably 0.03 to 0.7% by mass, more preferably 0.03 to 0.5% by mass, even more preferably 0.1 to 0.5% by mass, particularly preferably 0.1 to 0.3% by mass based on the total content of the components (1) to (4) (100% by mass).

The lamp cover of the present invention comprises at least the first selective wavelength absorbing material.

(Second Selective Wavelength Absorbing Material)

The lamp cover of the present invention comprises a second selective wavelength absorbing material. The second selective wavelength absorbing material has a maximum absorption wavelength within a range of 450 to 550 nm.

The composite tungsten oxide has a light shielding ability of decreasing a light transmissivity at a wavelength region of 800 to 2000 nm, but shields a higher wavelength region in a visible band of shorter than 800 nm in some cases, and as a result, the lamp cover may look bluish. In addition, as described above, the composite tungsten oxide is reduced by protons generated by the deterioration of the thermoplastic resin to change the light absorption property, the absorption band shifts to the shorter wavelength side, and as a result, blueness of the lamp cover can become strong. By using the second selective wavelength absorbing material having a maximum absorption wavelength within a range of 450 to 550 nm, blueness of the lamp cover is suppressed, and thus a substantially colorless lamp cover can be provided.

Examples of the second selective wavelength absorbing material include a red or orange dye having a maximum absorption wavelength within a range of 450 to 550 nm. Specifically, examples of the red dye include Color Index Numbers: Solvent Red 145, Solvent Red 135, Solvent Red 52, and Solvent Red 195, and the like, and examples of the orange dye include Color Index Numbers: Solvent Orange 60, and the like.

The second selective wavelength absorbing material may be used alone or in combination of two or more.

A content (total content in the case of containing two or more types) of the second selective wavelength absorbing material in the lamp cover of the present invention is preferably 1 to 100 ppm by mass, more preferably 2 to 10 ppm by mass based on the total content (100% by mass) of the components (1) to (4). By setting the content of the second selective wavelength absorbing material to 100 ppm by mass or less, the lamp cover excellent in weather resistance can be obtained, and by setting the content to 1 ppm by mass or more, blueness of the lamp cover can be more effectively suppressed.

(Lamp Cover)

The lamp cover of the present invention is normally obtained by injection-molding the thermoplastic resin composition of the present invention. Specifically, the lamp cover of the present invention can be obtained by a process that the aforementioned thermoplastic resin composition is used as a molding material, this thermoplastic resin composition in a molten state is charged into a cavity of a mold by injection, subsequently cooled, and then the molded product is removed from a mold. Specifically, the lamp cover of the present invention can be produced e.g. by a process that the aforementioned thermoplastic resin composition is pelletized and charged into a cylinder from a hopper, and melted while rotating a screw, and the screw is retracted to charge a predetermined amount of the thermoplastic resin composition into the cylinder, and the screw is advanced to injection-charge the molten thermoplastic resin composition into the mold while applying pressure, the pressure is maintained for a certain time until the mold is sufficiently cooled, and then the mold is opened to take out the molded product. Various conditions for producing the lamp cover of the present invention (e.g. a melt temperature in the cavity for the molding material, a mold temperature for injecting the molding material into the mold, a pressure maintained after charging the resin composition into the mold, etc.) may be optionally set, and are not particularly limited.

The lamp cover of the present invention may have a maximum transmissivity wavelength within a range of 550 to 780 nm. The term "maximum transmissivity wavelength" as used herein refers to a wavelength of light which exhibits the highest transmissivity according to the measurement of the light transmissivity. Since the heat ray-absorbing lamp cover of the present invention comprises the composite tungsten oxide as a heat ray-absorbing agent, light at the red region in the visible region can be absorbed. Since the absorption of light at the red region by the composite tungsten oxide suppresses bluing of the lamp cover, the maximum transmissivity wavelength of the lamp cover within a range of 550 to 780 nm is effective.

The maximum transmissivity wavelength within the range of 550 to 780 nm on the lamp cover of the present invention can be adjusted by changing the amount and type of the aforementioned second selective wavelength absorbing material.

The lamp cover of the present invention has an average visible light transmissivity of preferably 50% or higher, more preferably 70% or higher, even more preferably 75% or higher, still more preferably 80% or higher. Herein, the average visible light transmissivity of the lamp cover refers to a transmissivity at a wavelength region of 380 to 780 nm on a flat plate having a thickness of 2 mm prepared by injection-forming the thermoplastic resin composition. The lamp cover of the present invention has an average near-infrared light transmissivity of preferably 75% or lower, more preferably 70% or lower. Herein, the average near-infrared light transmissivity of the lamp cover refers to a transmissivity at a wavelength region of 800 to 2000 nm on the flat plate.

Hereinafter, the present invention will be explained in more detail with reference to Examples, but the present invention is not limited to Examples. Incidentally, various physical properties of the obtained resin composition were measured and evaluated according to the following methods.

EXAMPLES

Example 1

In a methacrylic resin ("Sumipex MH" manufactured by Sumitomo Chemical Co., Ltd., visible light transmissivity measured according to JIS R 3106 when the resin was formed into a plate-like molded body having a thickness of 2 mm: 92%), a composite tungsten oxide ("YMDS-874" manufactured by SUMITOMO METAL MINING CO., LTD. (an infrared shielding agent including about 23% by weight of $Cs_{0.33}WO_3$ (average particle size: 5 nm) and an organic dispersion resin)) ($Cs_{0.33}WO_3$ fine particle: 250 ppm by mass) at the mixing ratio of 1100 ppm by mass, a second selective wavelength absorbing material having a maximum absorption wavelength of 500 nm ("Sumiplast Red H3G" (color index number: S.R. 135) manufactured by Sumika Chemtex Co., Ltd.) at the mixing ratio of 3.3 ppm by mass, and a first selective wavelength absorbing material having a maximum absorption wavelength of 342 nm ("Sumisorb 200" manufactured by Sumika Chemtex Co., Ltd.) at the mixing ratio 0.1% by mass of were mixed. Then, the mixture was melt-kneaded and extruded into a strand shape using a single-screw extruder (screw diameter: 40 mm) so that the resin temperature was 250° C., cooled with water, and cut by a strand cutter to obtain a pellet, and this pellet was formed into a 100 mm-square flat plate having a thickness of 2 mm using a heat compression molding machine at a molding temperature of 210° C. A dispersed particle size of the composite oxide fine particle in the plate was 70 nm.

Example 2

A flat plate was prepared in the same manner as in Example 1 except that the mixing ratio of the first selective wavelength absorbing material having a maximum absorption wavelength of 342 nm ("Sumisorb 200" manufactured by Sumika Chemtex Co., Ltd.) was 0.15% by mass. A dispersed particle size of the composite oxide fine particle in the plate was 70 nm.

Example 3

A flat plate was prepared in the same manner as in Example 1 except that the mixing ratio of the first selective wavelength absorbing material having a maximum absorption wavelength of 342 nm ("Sumisorb 200" manufactured by Sumika Chemtex Co., Ltd.) was 0.03% by mass. A dispersed particle size of the composite oxide fine particle in the plate was 70 nm.

Example 4

A flat plate was prepared in the same manner as in Example 1 except that magnesium stearate was mixed instead of the first selective wavelength absorbing material having a maximum absorption wavelength of 342 nm ("Sumisorb 200" manufactured by Sumika Chemtex Co., Ltd.) at the mixing ratio of 0.1% by mass. A dispersed particle size of the composite oxide fine particle in the plate was 70 nm.

Example 5

A flat plate was prepared in the same manner as in Example 1 except that the mixing ratio of the first selective wavelength absorbing material having a maximum absorption wavelength of 342 nm ("Sumisorb 200" manufactured by Sumika Chemtex Co., Ltd.) was 0.15% by mass, the mixing ratio of magnesium stearate was 0.1% by mass. A dispersed particle size of the composite oxide fine particle in the plate was 70 nm.

Example 6

A flat plate was prepared in the same manner as in Example 1 except that the first selective wavelength absorbing material having a maximum absorption wavelength of 342 nm ("Sumisorb 200" manufactured by Sumika Chemtex Co., Ltd.) at the mixing ratio of 0.15% by mass, a magnesium stearate at the mixing ratio of 0.1% by mass, hindered amine-based antioxidant Sanol LS770 at the mixing ratio of 0.1% by mass, and a phosphoric acid-based antioxidant ("Sumilizer GP" manufactured by Sumitomo Chemical Co., Ltd.) at the mixing ratio of 0.1% by mass were mixed. A dispersed particle size of the composite oxide fine particle in the plate was 70 nm.

Example 7

A flat plate was prepared in the same manner as in Example 1 except that a phosphoric acid-based antioxidant ("Sumilizer GP" manufactured by Sumitomo Chemical Co., Ltd.) at the mixing ratio of 0.1% by mass was mixed instead of the the first selective wavelength absorbing material having a maximum absorption wavelength of 342 nm ("Sumisorb 200" manufactured by Sumika Chemtex Co., Ltd.). A dispersed particle size of the composite oxide fine particle in the plate was 70 nm.

Example 8

A flat plate was prepared in the same manner as in Example 1 except that the mixing ratio of the first selective wavelength absorbing material having a maximum absorption wavelength of 342 nm ("Sumisorb 200" manufactured by Sumika Chemtex Co., Ltd.) was 0.5% by mass. A dispersed particle size of the composite oxide fine particle in the plate was 70 nm.

Example 9

A flat plate was prepared in the same manner as in Example 1 except that the mixing ratio of the first selective wavelength absorbing material having a maximum absorption wavelength of 342 nm ("Sumisorb 200" manufactured by Sumika Chemtex Co., Ltd.) was 0.2% by mass. A dispersed particle size of the composite oxide fine particle in the plate was 70 nm.

Example 10

A flat plate was prepared in the same manner as in Example 2 except that the mixing ratio of the second selective wavelength absorbing material was 6.3 ppm by mass. A dispersed particle size of the composite oxide fine particle in the plate was 70 nm.

Example 11

In a methacrylic resin ("Sumipex MH" manufactured by Sumitomo Chemical Co., Ltd.), a composite tungsten oxide ("YMDS-874" manufactured by SUMITOMO METAL MINING CO., LTD. (an infrared shielding agent including about 23% of $Cs_{0.33}WO_3$ (average particle size: 5 nm) and an organic dispersion resin)) ($Cs_{0.33}WO_3$ fine particle: 206 ppm by mass) at the mixing ratio of 895 ppm by mass, a second selective wavelength absorbing material having a maximum absorption wavelength of 500 nm ("Sumiplast Red H3G" (color index number: S.R. 135) manufactured by Sumika Chemtex Co., Ltd.) at the mixing ratio of 2.7 ppm by mass, and a first selective wavelength absorbing material having a maximum absorption wavelength of 342 nm ("Sumisorb 200" manufactured by Sumika Chemtex Co., Ltd.) at the mixing ratio of 0.15% by mass were mixed. Then, the mixture was melt-kneaded and extruded into a strand shape using a single-screw extruder (screw diameter: 40 mm) so that the resin temperature was 250° C., cooled with water, and cut by a strand cutter to obtain a pellet, and this pellet was formed into a 100 mm-square flat plate having a thickness of 2 mm using a heat compression molding machine at a molding temperature of 210° C. A dispersed particle size of the composite oxide fine particle in the plate was 70 nm.

Example 12

A 100 mm-square flat plate having a thickness of 2 mm was prepared in the same manner as in Example 11 except that the mixing ratio of the second selective wavelength absorbing material ("Sumiplast Red H3G" (color index number: S.R. 135) manufactured by Sumika Chemtex Co., Ltd.) was 5.4 ppm by mass. A dispersed particle size of the composite oxide fine particle in the plate was 70 nm.

Example 13

A flat plate was prepared in the same manner as in Example 1 except that the first selective wavelength absorbing material having a maximum absorption wavelength of 310 nm ("Hostavin PR-25" manufactured by CLARIANT CHEMICALS K.K.) at the mixing ratio of 0.15% by mass was mixed instead of the first selective wavelength absorbing material having a maximum absorption wavelength of 342 nm ("Sumisorb 200" manufactured by Sumika Chemtex Co., Ltd.). A dispersed particle size of the composite oxide fine particle in the plate was 70 nm.

Example 14

A flat plate was prepared in the same manner as in Example 1 except that magnesium stearate at the mixing ratio of 0.05% by mass was mixed instead of the first selective wavelength absorbing material having a maximum absorption wavelength of 342 nm ("Sumisorb 200" manufactured by Sumika Chemtex Co., Ltd.). A dispersed particle size of the composite oxide fine particle in the plate was 70 nm.

Example 15

A flat plate was prepared in the same manner as in Example 1 except that magnesium stearate at the mixing ratio of 0.2% by mass was mixed instead of the first selective wavelength absorbing material having a maximum absorption wavelength of 342 nm ("Sumisorb 200" manufactured by Sumika Chemtex Co., Ltd.). A dispersed particle size of the composite oxide fine particle in the plate was 70 nm.

Example 16

A flat plate was prepared in the same manner as in Example 2 except that the mixing ratio of the second selective wavelength absorbing material was 2.2 ppm by mass. A dispersed particle size of the composite oxide fine particle in the plate was 70 nm.

Example 17

A flat plate was prepared in the same manner as in Example 2 except that a selective wavelength absorbing material having a maximum absorption wavelength of 450 nm ("Sumiplast Orange HRP" (color index number: S.O. 60) manufactured by Sumika Chemtex Co., Ltd.) at the mixing ratio of 3.3 ppm by mass was mixed instead of the second selective wavelength absorbing material having a maximum absorption wavelength of at the mixing ratio of 500 nm ("Sumiplasst Red H3G" (color index number: S.R. 135) manufactured by Sumika Chemtex Co., Ltd.). A dispersed particle size of the composite oxide fine particle in the plate was 70 nm.

Example 18

A mixture was prepared by mixing a composite tungsten oxide ("YMDS-874BT" manufactured by SUMITOMO METAL MINING CO., LTD. (about 23% by weight of $Cs_{0.33}WO_3$ (average particle size: 10 nm)) ($Cs_{0.33}WO_3$ fine particle: 240 ppm by mass) at the mixing ratio of 1040 ppm by mass, a second selective wavelength absorbing material having a maximum absorption wavelength of 500 nm ("Sumiplast Red H3G" (color index number: S.R. 135) manufactured by Sumika Chemtex Co., Ltd.) at the mixing ratio of 3.3 ppm by mass, and a first selective wavelength absorbing material having a maximum absorption wavelength of 342 nm ("Sumisorb 200" manufactured by Sumika Chemtex Co., Ltd.) at the mixing ratio of 0.1% by mass, and a hindered amine-based antioxidant Sanol LS770 at the mixing ratio of 0.1% by mass. Then, the mixture was melt-kneaded and extruded into a strand shape using a single-screw extruder (screw diameter: 40 mm) so that the resin temperature was 250° C., cooled with water, and cut by a strand cutter to obtain a pellet, and this pellet was formed into a 100 mm-square flat plate having a thickness of 2 mm using a heat compression molding machine at a molding temperature of 210° C. A dispersed particle size of the composite oxide fine particle in the plate was 70 nm.

Example 19

A flat plate was prepared in the same manner as in Example 18 except that a phosphoric acid-based antioxidant ("Sumirizer GP" manufactured by Sumitomo Chemical Co., Ltd.) at the mixing ratio of 0.1% by mass was additionally mixed. A dispersed particle size of the composite oxide fine particle in the plate was 70 nm.

Example 20

A flat plate was prepared in the same manner as in Example 18 except that a phosphoric acid-based antioxidant ("Sandstab P-EPQ manufactured by CLARIANT) was mixed instead of the phosphoric acid-based antioxidant ("Sumirizer GP" manufactured by Sumitomo Chemical Co., Ltd.), and magnesium stearate at the mixing ratio of 0.1% by mass was mixed. A dispersed particle size of the composite oxide fine particle in the plate was 70 nm.

Example 21

A flat plate was prepared in the same manner as in Example 18 except that the phosphoric acid-based antioxidant ("Sandstab P-EPQ manufactured by CLARIANT) at the mixing ratio of 0.1% by mass and magnesium stearate at the mixing ratio of 0.1% by mass were mixed instead of the hindered amine-based antioxidant (LS-770). A dispersed particle size of the composite oxide fine particle in the plate was 70 nm.

Comparative Example 1

A flat plate was prepared in the same manner as in Example 1 except that the mixing ratio of the first selective wavelength absorbing material having a maximum absorption wavelength of 342 nm ("Sumisorb 200" manufactured by Sumika Chemtex Co., Ltd.) was 0.015% by mass. A dispersed particle size of the composite oxide fine particle in the plate was 70 nm.

Comparative Example 2

A flat plate was prepared in the same manner as in Example 1 except that a selective wavelength absorbing material having a maximum absorption wavelength of 425 nm ("Sumiplast Lemon Yellow HL" (color index number: S.Y. 33) manufactured by Sumika Chemtex Co., Ltd.) at the mixing ratio of 2.0 ppm by mass was mixed instead of the second selective wavelength absorbing material having a maximum absorption wavelength of 500 nm ("Sumiplast Red H3G" (color index number: S.R. 135) manufactured by Sumika Chemtex Co., Ltd.). A dispersed particle size of the composite oxide fine particle in the plate was 70 nm.

Comparative Example 3

A flat plate was prepared in the same manner as in Example 1 except that a selective wavelength absorbing material having a maximum absorption wavelength of 425 nm ("Sumiplast Lemon Yellow HL" (color index number: S.Y. 33) manufactured by Sumika Chemtex Co., Ltd.) at the mixing ratio of 4.0 ppm by mass was mixed instead of the second selective wavelength absorbing material having a maximum absorption wavelength of 500 nm ("Sumiplast Red H3G" (color index number: S.R. 135) manufactured by Sumika Chemtex Co., Ltd.). A dispersed particle size of the composite oxide fine particle in the plate was 70 nm.

Comparative Example 4

A flat plate was prepared in the same manner as in Example 1 except that a selective wavelength absorbing material having a maximum absorption wavelength of 425 nm ("Sumiplast Lemon Yellow HL" (color index number: S.Y. 33) manufactured by Sumika Chemtex Co., Ltd.) was used instead of the first selective wavelength absorbing material having a maximum absorption wavelength of 342 nm ("Sumisorb 200" manufactured by Sumika Chemtex Co., Ltd.), and the second selective wavelength absorbing material was not used. A dispersed particle size of the composite oxide fine particle in the plate was 70 nm.

TABLE 1

| | $Cs_{0.33}WO_3$ | First selective wavelength absorbing material | Metal soap | Antioxidant | Second selective wavelength absorbing material | Other selective wavelength absorbing materials |
|---|---|---|---|---|---|---|
| Example 1 | 250 ppm by mass | Sumisorb 200, 0.1% by mass | — | — | Sumiplast Red H3G, 3.3 ppm by mass | — |
| Example 2 | 250 ppm by mass | Sumisorb 200, 0.15% by mass | — | — | Sumiplast Red H3G, 3.3 ppm by mass | — |
| Example 3 | 250 ppm by mass | Sumisorb 200, 0.03% by mass | — | — | Sumiplast Red H3G, 3.3 ppm by mass | — |

TABLE 1-continued

| | $Cs_{0.33}WO_3$ | First selective wavelength absorbing material | Metal soap | Antioxidant | Second selective wavelength absorbing material | Other selective wavelength absorbing materials |
|---|---|---|---|---|---|---|
| Example 4 | 250 ppm by mass | — | Magnesium stearate, 0.1% by mass | — | Sumiplast Red H3G, 3.3 ppm by mass | — |
| Example 5 | 250 ppm by mass | Sumisorb 200, 0.15% by mass | Magnesium stearate, 0.1% by mass | — | Sumiplast Red H3G, 3.3 ppm by mass | — |
| Example 6 | 250 ppm by mass | Sumisorb 200, 0.15% by mass | Magnesium stearate, 0.1% by mass | SanolLS770, 0.1% by mass Sumirizer GP, 0.1% by mass | Sumiplast Red H3G, 3.3 ppm by mass | — |
| Example 7 | 250 ppm by mass | — | — | Sumirizer GP, 0.1% by mass | Sumiplast Red H3G, 3.3 ppm by mass | — |
| Example 8 | 250 ppm by mass | Sumisorb 200, 0.5% by mass | — | — | Sumiplast Red H3G, 3.3 ppm by mass | — |
| Example 9 | 250 ppm by mass | Sumisorb 200, 0.2% by mass | — | — | Sumiplast Red H3G, 3.3 ppm by mass | — |
| Example 10 | 250 ppm by mass | Sumisorb 200, 0.15% by mass | — | — | Sumiplast Red H3G, 6.3 ppm by mass | — |
| Example 11 | 206 ppm by mass | Sumisorb 200, 0.15% by mass | — | — | Sumiplast Red H3G, 2.7 ppm by mass | — |
| Example 12 | 206 ppm by mass | Sumisorb 200, 0.15% by mass | — | — | Sumiplast Red H3G, 5.4 ppm by mass | — |
| Example 13 | 250 ppm by mass | Hostavin PR-25, 0.15% by mass | — | — | Sumiplast Red H3G, 3.3 ppm by mass | — |
| Example 14 | 250 ppm by mass | — | Magnesium stearate, 0.05% by mass | — | Sumiplast Red H3G, 3.3 ppm by mass | — |
| Example 15 | 250 ppm by mass | — | Magnesium stearate, 0.2% by mass | — | Sumiplast Red H3G, 3.3 ppm by mass | — |
| Example 16 | 250 ppm by mass | Sumisorb 200, 0.15% by mass | — | — | Sumiplast Red H3G, 2.2 ppm by mass | — |
| Example 17 | 250 ppm by mass | Sumisorb 200, 0.15% by mass | — | — | Sumiplast OrangeHRP, 3.3 ppm by mass | — |
| Example 18 | 240 ppm by mass | Sumisorb 200, 0.1% by mass | — | SanolLS770, 0.1% by mass | Sumiplast Red H3G, 3.3 ppm by mass | — |
| Example 19 | 240 ppm by mass | Sumisorb 200, 0.1% by mass | — | SanolLS770, 0.1% by mass Sumirizer GP, 0.1% by mass | Sumiplast Red H3G, 3.3 ppm by mass | — |
| Example 20 | 240 ppm by mass | Sumisorb 200, 0.1% by mass | Magnesium stearate, 0.1% by mass | SanolLS770, 0.1% by mass Sandstab P-EPQ, 0.1% by mass | Sumiplast Red H3G, 3.3 ppm by mass | — |
| Example 21 | 240 ppm by mass | Sumisorb 200, 0.1% by mass | Magnesium stearate, 0.1% by mass | Sandstab P-EPQ, 0.1% by mass | Sumiplast Red H3G, 3.3 ppm by mass | — |

TABLE 2

| | | | | | | |
|---|---|---|---|---|---|---|
| Comparative Example 1 | 250 ppm by mass | Sumisorb 200, 0.015% by mass | — | — | Sumiplast Red H3G, 3.3 ppm by mass | — |
| Comparative Example 2 | 250 ppm by mass | Sumisorb 200, 0.1% by mass | — | — | Sumiplast Lemon Yellow HL 2.0 ppm by mass | — |
| Comparative Example 3 | 250 ppm by mass | Sumisorb 200, 0.1% by mass | — | — | Sumiplast Lemon Yellow HL 4.0 ppm by mass | — |
| Comparative Example 4 | 250 ppm by mass | — | — | — | Sumiplast Lemon Yellow HL 0.1 ppm by mass | — |

Physical Property Test

<Average Visible Light Transmissivity and Average Near-Infrared Transmissivity>

The light transmissivity of the prepared flat plate at a optical path length of 2 mm was measured every 5 nm in a wavelength range of 300 to 2000 nm using a plastic property measurement system ("U-4000 type spectrophotometer" manufactured by Hitachi, Ltd.), and an average value of the obtained light transmissivities in a wavelength range of 380 to 780 nm was defined as "visible light transmissivity", and an average value in a wavelength range of 800 to 2000 nm was defined as "infrared transmissivity". At the same time, the maximum transmissivity wavelength was confirmed. The results are shown in the following Table 3.

<Chroma>

On the prepared flat plate, a chroma $C^*=(a^{*2}+b^{*2})^{0.5}$ (CIE1976) was calculated from the a*, b*, L* chromaticity diagram using C light source. The results are shown in the following Table 3. As the chroma is lower, the color of the flat plate becomes closer to achromatic color, and the flat plate is more excellent in transparency.

<Temperature Rising Ability>

The prepared flat plate was irradiated with light using a solar simulator ("OTENTO-SUN II" manufactured by Bunkoukeiki Co., Ltd.) under a condition that a distance between the flat plate and the light source was 21 cm, an irradiation intensity was 100 mW/cm² and a illuminance of the flat plate surface irradiated with light was 120,000 lx for 2 minute, the temperature after the irradiation was measured by a thermo camera, and a difference with the initial temperature was defined as a temperature rise degree. The results are shown in the following Table 3. High temperature rise degree of the flat plate means that the lamp cover hardly generates dew condensation and is excellent in antifogging property.

<Weather Resistance Test>

The prepared flat plate was irradiated with a UVB313 light source using an ultraviolet fluorescent lamp type weather resistance tester ("UVCON" manufactured by Atlas Material Testing Technology LLC) at 60° C. for 100 hours. The chromaticity of the flat plate under the A light source before the irradiation, and the chromaticity of the flat plate under the A light source after the irradiation were measured using a spectral colorimeter ("SQ2000" manufactured by NIPPON DENSHOKU INDUSTRIES Co., LTD.). A color change of the flat plate before and after the irradiation was calculated by an equation $\Delta E^*(ab)=(L^{*2}+a^{*2}+b^{*2})^{0.5}$ (CIE 1976). In addition, in the same way as described above, the visible light transmissivities of the flat plate before and after the irradiation were measured to calculate a transmissivity change ΔT of the flat plate before and after the irradiation. The results are shown in the following Table 3. The smaller the value of the ΔE* or the ΔT is, the better the weather resistance of the flat plate is.

TABLE 3

| | Visible light transmissivity (%) | Infrared transmissivity (%) | Maximum wavelength (nm) | Chroma C* | Temperature rise degree (° C.) | Color change ΔE* | Transmissivity change ΔT |
|---|---|---|---|---|---|---|---|
| Example 1 | 78 | 32 | 575 | 2.5 | 6 | 0.2 | −0.4 |
| Example 2 | 78 | 30 | 575 | 2.6 | 6 | 0.1 | −0.1 |
| Example 3 | 79 | 30 | 565 | 2.4 | 6 | 0.8 | −0.7 |
| Example 4 | 72 | 20 | 560 | 2.7 | 8 | 0.7 | −0.3 |
| Example 5 | 71 | 22 | 570 | 2.9 | 8 | 0.6 | +0.5 |
| Example 6 | 72 | 25 | 570 | 2.9 | 7 | 0.1 | −0.3 |
| Example 7 | 76 | 24 | 570 | 1.9 | 7 | 1.5 | −2.4 |
| Example 8 | 76 | 29 | 575 | 2.3 | 6 | 0.2 | +0.3 |
| Example 9 | 77 | 30 | 580 | 3.1 | 6 | 0.3 | +1.1 |
| Example 10 | 77 | 31 | 580 | 3.0 | 6 | 0.2 | +0.1 |
| Example 11 | 81 | 40 | 555 | 2.1 | 5 | 0.2 | +0.0 |
| Example 12 | 80 | 39 | 595 | 2.7 | 5 | 0.2 | −0.5 |
| Example 13 | 78 | 26 | 575 | 2.4 | 7 | 0.2 | −0.5 |
| Example 14 | 75 | 21 | 565 | 2.0 | 8 | 0.9 | −1.8 |
| Example 15 | 73 | 21 | 570 | 2.6 | 8 | 0.9 | −1.2 |
| Example 16 | 78 | 29 | 565 | 2.6 | 6 | 0.3 | −0.7 |
| Example 17 | 79 | 32 | 560 | 4.7 | 6 | 0.3 | −0.6 |
| Example 18 | 77 | 30 | 580 | 4.0 | 6 | 0.1 | −0.1 |
| Example 19 | 75 | 24 | 570 | 3.6 | 7 | 0.1 | −0.2 |
| Example 20 | 73 | 23 | 570 | 4.5 | 8 | 0.2 | −0.4 |
| Example 21 | 72 | 22 | 575 | 4.5 | 8 | 0.3 | −0.5 |
| Comparative Example 1 | 80 | 33 | 575 | 2.6 | 6 | 2.8 | −3.4 |
| Comparative Example 2 | 78 | 33 | 535 | 5.6 | 6 | 0.5 | −0.4 |
| Comparative Example 3 | 77 | 31 | 520 | 8.7 | 6 | 0.6 | −0.1 |
| Comparative Example 4 | 63 | 35 | 540 | 83.5 | 5 | 0.5 | −0.5 |

<Moist Heat Resistance Test>

The prepared flat plate was allowed to stand in a moist heat oven at 80° C. and 95% RH for 500 hours. The chromaticity of the flat plate under the A light source before the standing, and the chromaticity of the flat plate under the A light source after the standing were measured using a spectral colorimeter ("SQ2000" manufactured by NIPPON DENSHOKU INDUSTRIES Co., LTD.). A color change of the flat plate before and after the standing was calculated by an equation $\Delta E^*(ab)=(L^{*2}+a^{*2}+b^{*2})^{0.5}$ (CIE 1976). In addition, in the same way as described above, the visible light transmissivities of the flat plate before and after the standing were measured to calculate a transmissivity change ΔT of the flat plate before and after the standing. The results are shown in the following Table 4. The smaller the value of the ΔE* or the ΔT is, the better the moist heat resistance of the flat plate is.

TABLE 4

|  | Color change ΔE* | Transmissivity change ΔT |
|---|---|---|
| Example 1 | 0.7 | 1.9 |
| Example 2 | 0.7 | 1.9 |
| Example 3 | 0.5 | 1.7 |
| Example 8 | 1.0 | 2.5 |
| Example 9 | 0.7 | 1.9 |
| Example 13 | 0.6 | 1.8 |

The present patent application claims priority for JP-2017-031900 (filed on Feb. 23, 2017), and the invention is incorporated herein by reference in their entirety.

INDUSTRIAL APPLICABILITY

The lamp cover of the present invention can be used as a cover for covering any light source, and can be suitably used particularly as a cover for a light source with which temperature rise of the cover due to irradiation of a lamp is small.

The invention claimed is:

1. A lamp cover comprising
(1) a thermoplastic resin having a visible light transmissivity of 50% or higher measured in a form of a plate-like molded body having a thickness of 2 mm according to JIS R 3106,
(2) a composite tungsten oxide,
(3) a first selective wavelength absorbing material having a maximum absorption wavelength within a range of 200 to 350 nm, and
at least one material selected from the group consisting of a metal soap and an antioxidant,
wherein a content of the first selective wavelength absorbing material having a maximum absorption wavelength within a range of 200 to 350 nm, whose content is 0.03 to 0.5% by mass or more based on a total content (100% by mass) of the components (1) to (4),
a content of the metal soap is 0.03 to 0.3% by mass based on the total content (100% by mass) of the components (1) to (4), when the metal soap is contained in the lamp cover, and
a content of the antioxidant is 0.05 to 0.3% by mass based on the total content (100% by mass) of the components (1) to (4), when the antioxidant is contained in the lamp cover, and
(4) a second selective wavelength absorbing material having a maximum absorption wavelength within a range of 450 to 550 nm.

2. The lamp cover according to claim 1, wherein the composite tungsten oxide is represented by the general formula:

$$M^1_x W_y O_z$$

wherein
$M^1$ is at least one element selected from the group consisting of H, He, an alkali metal, an alkaline earth metal, a rare earth element, Mg, Zr, Cr, Mn, Fe, Ru, Co, Rh, Ir, Ni, Pd, Pt, Cu, Ag, Au, Zn, Cd, Al, Ga, In, Tl, Si, Ge, Sn, Pb, Sb, B, F, P, S, Se, Br, Te, Ti, Nb, V, Mo, Ta, Re, Be, Hf, Os, Bi and I,
W is tungsten element,
O is oxygen element, and
x, y and z are numbers satisfying the following formulae:

$$0.01 \leq x \leq 1$$

$$0.001 \leq x/y \leq 1, \text{ and}$$

$$2.2 \leq z/y \leq 3.0.$$

3. The lamp cover according to claim 2, wherein $M^1$ is at least one element selected from the group consisting of Li, Na, K, Rb, Cs, Mg, Ca, Sr and Ba.

4. The lamp cover according to claim 1, comprising as the component (3) the first selective wavelength absorbing material, the metal soap, and the antioxidant.

5. The lamp cover according to claim 1, comprising 0.05 to 0.3% by mass of the metal soap based on the total content (100% by mass) of the components (1) to (4).

6. The lamp cover according to claim 1, comprising 0.05 to 0.3% by mass of the antioxidant based on the total content (100% by mass) of the components (1) to (4), wherein the antioxidant comprises a hindered amine-based antioxidant or a phosphoric acid-based antioxidant.

7. The lamp cover according to claim 1, having a maximum transmissivity wavelength within a range of 550 to 780 nm.

8. The lamp cover according to claim 1, wherein the first selective wavelength absorbing material is a benzotriazole-based ultraviolet absorber.

9. The lamp cover according to claim 1, comprising the metal soap selected from the group consisting of a magnesium salt of lauric acid, myristic acid, pentadecylic acid, palmitic acid, palmitoleic acid, margaric acid or stearic acid.

10. The lamp cover according to claim 9 wherein the metal soap is a magnesium salt of stearic acid.

11. A lamp cover comprising
(1) a thermoplastic resin having a visible light transmissivity of 50% or higher measured in a form of a plate-like molded body having a thickness of 2 mm according to JIS R 3106,
(2) a composite tungsten oxide,
(3) at least one material selected from a group consisting of
a metal soap in a content of 0.03 to 0.3% by mass based on the total content (100% by mass) of the components (1) to (4), and
an antioxidant in a content of 0.05 to 0.3% by mass based on the total content (100% by mass) of the components (1) to (4), and
(4) a second selective wavelength absorbing material having a maximum absorption wavelength within a range of 450 to 550 nm.

* * * * *